US010798809B2

(12) United States Patent
Hayashi

(10) Patent No.: US 10,798,809 B2
(45) Date of Patent: Oct. 6, 2020

(54) INDUCTIVELY COUPLED PLASMA GENERATOR

(71) Applicant: Shimadzu Corporation, Kyoto (JP)

(72) Inventor: Hidemiki Hayashi, Kyoto (JP)

(73) Assignee: Shimadzu Coporation, Kyoto (JP)

( * ) Notice: Subject to any disclaimer, the term of this patent is extended or adjusted under 35 U.S.C. 154(b) by 217 days.

(21) Appl. No.: 16/034,403

(22) Filed: Jul. 13, 2018

(65) Prior Publication Data

US 2020/0022244 A1 Jan. 16, 2020

(51) Int. Cl.

*B23K 10/00* (2006.01)
*H05H 1/30* (2006.01)
*H05H 1/46* (2006.01)
*H01J 49/10* (2006.01)

(52) U.S. Cl.

CPC ................ *H05H 1/30* (2013.01); *H05H 1/46* (2013.01); *H01J 49/105* (2013.01); *H05H 2001/4667* (2013.01)

(58) Field of Classification Search

CPC .... H05H 1/30; H05H 1/34; H05H 2001/4667; H05H 1/46; H01J 49/105
USPC ............ 219/121.52, 121.51, 121.57, 121.48; 313/231.51; 315/111.51
See application file for complete search history.

(56) References Cited

U.S. PATENT DOCUMENTS 4,818,916 A * 4/1989 Morrisroe ................ H05H 1/30 219/121.36
7,737,397 B2 * 6/2010 Morrisroe ............. F23C 99/003 250/288
9,259,798 B2 * 2/2016 Morrisroe ................ H05H 1/42
2015/0041454 A1 * 2/2015 Foret .................... B23K 10/006 219/601

FOREIGN PATENT DOCUMENTS

JP 2001-183297 A 7/2001
JP 2007-93578 A 4/2017

* cited by examiner

*Primary Examiner* — Mark H Paschall
(74) *Attorney, Agent, or Firm* — Maier & Maier, PLLC

(57) ABSTRACT

A conductive rod body is embedded in an insulative torch adapter into which a plasma torch is fitted so that a leading end protrudes from its outer circumferential surface. Further, a metal plate member electrically connected to a cable line to which a voltage for plasma ignition is applied is attached to a lower holder, and a conductive leaf spring member having a V-shaped cross section is attached to an upper holder. When the torch adapter is placed on the lower holder so that the protruding part of the rod body faces upward and the upper holder is closed to tighten a draw latch, the rod body and the metal plate member are electrically connected via the leaf spring member, and a high voltage for ignition can be applied to the plasma torch.

8 Claims, 6 Drawing Sheets

(a) OPEN STATE OF UPPER HOLDER (b) CLOSED STATE OF UPPER HOLDER

INDUCTIVELY COUPLED PLASMA GENERATOR

FIELD

The present invention relates to an inductively coupled plasma generator for generating an inductively coupled plasma in an ICP analyzer such as an inductively coupled plasma (ICP) mass spectrometer or an ICP spectroscopic analyzer.

BACKGROUND

In the ICP mass spectrometer, an atomized sample (mainly an inorganic substance such as a metal) is introduced into a plasma flame generated by inductively coupled plasma to ionize the sample, and ions generated thereby are provided to a mass spectrometry, thereby performing a qualitative analysis or quantitative analysis of the sample. Further, in the ICP spectroscopic analyzer, an atomized sample is introduced into a plasma flame generated by inductively coupled plasma, spectroscopic analysis is performed on luminescent light emitted by heating and exciting a sample molecule or atom, thereby performing a qualitative analysis or quantitative analysis of the sample. Here, analyzers utilizing an inductively coupled plasma generator such as an ICP mass spectrometer and an ICP spectroscopic analyzer are collectively referred to as an ICP analyzer.

FIG. 5 is a schematic configuration diagram of a conventional inductively coupled plasma generator disclosed in Patent Literature 1 or the like. The inductively coupled plasma generator includes a plasma torch 3 having a coaxial triple cylindrical pipe structure, an induction coil 5 disposed outside a leading end portion of the plasma torch 3, and a high-frequency power source 101 which supplies high-frequency power to the induction coil 5. When cooling gas such as argon is externally supplied to a cylindrical pipe 3*a* on an outermost circumferential side in the plasma torch 3, plasma gas such as argon is similarly supplied to a cylindrical pipe 3*b* on the inner side thereof, and high-frequency power (for example, frequency 17.12 MHz, power 1.8 kW) is supplied to the induction coil 5, the plasma gas is ionized by electromagnetic induction, and a high-temperature plasma flame 100 is formed at the leading end of the plasma torch 3. When a sample to be measured is atomized by a nebulizer (not illustrated), placed on a carrier gas (such as argon gas), introduced into the plasma flame 100 through an innermost cylindrical pipe 3*c*, and the component molecules (or atoms) in the sample are heated and excited, so that the sample emits light or is ionized.

FIG. 6 is a perspective view of a conventional inductively coupled plasma generator. A torch holder 2 that approximately horizontally holds the plasma torch 3 having a substantially cylindrical outer shape is attached onto a base 1. The torch holder 2 includes an insulative lower holder 21 and an upper holder 22 which are hidden in FIG. 6 and are connected to each other by an invisible hinge. The plasma torch 3 is fitted into an insulative torch adapter 4 having an approximately flat and substantially annular outer shape, and in a state in which the torch adapter 4 is sandwiched between the lower holder 21 and the upper holder 22, by tightening a draw latch 23 to fix the upper holder 22 to the lower holder 21, the plasma torch 3 is held by the torch holder 2. At this time, the leading end portion of the plasma torch 3 is in a state of being inserted into the induction coil 5. Each of two branch pipes 301 protruding sideways from the lower part of the plasma torch 3 communicates with the cylindrical pipes 3*a* and 3*b* on the inner side of the torch 3, and a flexible gas pipe 7 to which a cooling gas and a plasma gas are supplied is connected to the two branch pipes 301.

The reason why the torch adapter 4 is used instead of directly holding the circumferential surface of the plasma torch 3 by the holder 2 is that the torch 3 can be held by the common torch holder 2, using the torch adapter 4 having a different inner diameter at the center opening portion for each of the plural types of plasma torches 3 having different outer diameters.

In the inductively coupled plasma generator as described above, plasma cannot be generated merely by supplying high-frequency power of a normal level to the induction coil 5 at the time of start-up or the like, and in general, it is necessary to cause initial ionization of the plasma gas required for plasma ignition. Therefore, in the conventional inductively coupled plasma generator, for example, the plasma ignition is performed by applying a high-voltage pulse from an ignition circuit including a Tesla coil or the like, which is a type of resonance transformer, to an electrode which is in electrical contact with the plasma torch. In the inductively coupled plasma generator illustrated in FIGS. 5 and 6, the circular opening portion of an R type crimp terminal 8 attached to the distal end of a cable line 6 leading to an ignition circuit 102 is inserted through one of the two branch pipes 301, thereby brining the distal end of the cable line 6 into contact with the plasma torch 3. As a high-voltage application electrode for plasma ignition, as disclosed in Patent Literature 2 and the like, there is also an example which uses a needle-like electrode or a plate-like electrode disposed so as to be in contact with the plasma torch.

However, in the conventional inductively coupled plasma generator, at the time of replacing the plasma torch 3, an operator temporarily removes the R type crimp terminal 8 from the branch pipe 301 of the plasma torch 3, and after another plasma torch 3 is held by the torch holder 2, it is necessary to attach the R type crimp terminal 8 of the distal end of the cable line 6 to the branch pipe 301 of the torch 3. Therefore, there was a problem of taking time and labor in a replacement operation of the plasma torch 3.

In addition, an inductively coupled plasma generator having a configuration in which a high-voltage application electrode biased by a spring, which is electrically connected to the distal end of the cable line, is provided at the bottom of the groove of the torch holder formed with the groove in which the plasma torch is directly mounted has also been known. In this generator, when the plasma torch is placed in the groove of the torch holder, the spring for urging the high-voltage application electrode is urged by the weight of the plasma torch, and the electrode comes into contact with the circumferential surface of the plasma torch by the urging force.

However, with such a configuration, in a state in which the plasma torch is placed in the groove of the torch holder, the urging force of the spring may be applied to the plasma torch from the bottom and the torch may be inclined in some cases. For this reason, it is difficult to position the plasma torch relative to the torch holder. Also, originally, such an inductively coupled plasma generator copes with a plasma torch having only one type of outer diameter, and there is a problem that the inductively coupled plasma generator does not cope with plural types of plasma torches having different outer diameters.

Patent Literature 1: JP-A-2007-93578
Patent Literature 2: JP-A-2001-183297

SUMMARY

The invention has been made to solve the above problems, and an object of the invention is to provide an inductively coupled plasma generator which is capable of coping with plural types of plasma torches having different outer diameters, and does not need to attach or detach terminal of the distal end of the cable line for plasma ignition to and from the torch at the time of replacing the plasma torch.

Solution to Problem

In order to solve the above problems, the invention provides an inductively coupled plasma generator which supplies high-frequency power to an induction coil disposed outside a leading end portion of a plasma torch having a substantially cylindrical outer shape to form an inductively coupled plasma flame at a leading end of the torch, the inductively coupled plasma generator including:

a) a torch adapter which is a substantially flat annular insulative body having an opening portion into which the plasma torch is inserted, and into which a conductive rod body is buried, one end of the conductive rod body being exposed to face the opening portion, and the other end of the conductive rod body protruding by a predetermined length toward an outer circumferential side;

b) a torch holder which holds the plasma torch substantially horizontally by grasping the torch adapter into which the plasma torch is inserted, and has a lower holder which supports a lower side of the torch adapter, an upper holder which suppresses an upper side of the torch adapter, and an engaging part which fixes the upper holder to the lower holder in a state in which the torch adapter is interposed; and c) a conductive first member which is electrically connected to a cable line for applying a voltage for plasma ignition and provided in the upper holder, and has a first contact part which abuts on the rod body to press the rod body downward by an elastic force, when the upper holder is closed and engaged by the engaging part in a state in which the torch adapter is placed on the lower holder so that the protruding part of the rod body of the torch adapter faces upward.

Typically, the inductively coupled plasma generator according to the invention is used for an ICP mass spectrometer, an ICP spectroscopic analyzer, and the like.

In the inductively coupled plasma generator according to the invention, when holding the plasma torch in the torch holder, the torch adapter fitted with the plasma torch is placed at a predetermined position on the lower holder such that a protruding part of the conductive rod body faces upward (preferably right above). When the upper holder is closed so as to sandwich the torch adapter from above and below in this state, the leading end of the protruding part of the rod body of the torch adapter abuts on the conductive first member provided in the upper holder. Since at least the contact part of the conductive first member with which the protruding part of the rod body abuts has elastic force, the contact part receives an upward force from the rod body, and inversely, presses the rod body downward by the elastic force. Since the contact part of the conductive first member is pressed against the leading end of the rod body by the elastic force, sufficient electrical contact between them is secured. Accordingly, a cable line for applying a voltage for plasma ignition is electrically connected to the outer surface of the plasma torch via the conductive first member and the rod body, and a high voltage for plasma ignition can be applied to the plasma torch. Also, at this time, since the torch adapter is pressed against the lower holder from above by the conductive first member, the position of the plasma torch is not likely to be misaligned, and the torch adapter is stably held by the holder.

That is, in the inductively coupled plasma generator according to the invention, the conductive first member provided in the upper holder has a function as a wiring for applying a high voltage for plasma ignition to the outer surface of the plasma torch.

Further, in the inductively coupled plasma generator according to the invention, the torch adapter may have an inner diameter of an opening portion corresponding to the outer diameter of the plasma torch to be used, and its outer diameter, which is a substantially flat annular body, may be common regardless of the outer diameter.

According to this configuration, even when plural kinds of plasma torches having different outer diameters are used, merely by using the torch adapter adapted to each plasma torch, the other configurations can be totally common, without depending on the outer diameter of the plasma torch. This makes it possible to cope with plural types of plasma torches having different outer diameters, while suppressing an increase in cost.

Further, as an aspect of the inductively coupled plasma generator according to the invention, the upper holder may be pivotally mounted about an axis substantially horizontal to the lower holder, and the engaging part may be a draw latch which engages the upper holder and the lower holder in a state in which the upper holder is closed with respect to the lower holder.

According to this configuration, since the operator can mount the plasma torch on the torch holder, by merely placing the plasma torch on the lower holder at a predetermined position, and by rotating the upper holder so as to cover the lower holder and tightening the draw latch, the operation is simple.

Further, as an aspect of the inductively coupled plasma generator according to the invention, it is possible to provide a configuration in which a conductive second member extending vertically and electrically connected to a cable line for applying a voltage for plasma ignition is provided in the lower holder, and the conductive first member has a second contact part which abuts on the upper end of the conductive second member to press the second member downward by elastic force, when the upper holder is closed and engaged by the engaging part.

In this configuration, the cable line is electrically connected to the outer surface of the plasma torch via the conductive second member, the conductive first member, and the rod body. In this case, the distal end of the cable line can be fixed to the lower holder rather than the upper holder. For example, as described above, when the upper holder is free to pivot with respect to the lower holder and the lower holder is fixed to a base or the like, the upper holder is rotated each time the plasma torch is replaced. Therefore, when the distal end of the cable line is fixed to the upper holder, a load such as pulling is applied to the cable line each time the plasma torch is replaced. According to the above configuration, however, since the distal end of the cable line is fixed to the lower holder, it is possible to reduce the load applied to the cable lines and make it hard to cause disconnection and the like.

According to the inductively coupled plasma generator of the invention, in a case where an operator replaces the plasma torch, when performing an operation of holding a newly loaded plasma torch with the torch holder, a reliable electrical conduction between the outer surface of the plasma torch and the distal end of the cable line from the ignition circuit is secured, and there is a state in which the high-voltage pulse can be applied to the plasma torch from the ignition circuit. Thus, there is no need for an operation of attaching and detaching the distal end of the cable line from the ignition circuit at the time of replacing the plasma torch, thereby reducing the labor of the operator and improving the operating efficiency. Also, in such a state in which the reliable electrical conduction is ensured, since the plasma torch is stably held and the position of the plasma torch with respect to the induction coil or the like is also determined, for example, the interval between the induction coil and the plasma torch can be appropriately maintained to form a favorable plasma flame.

DETAILED DESCRIPTION

Figure 1:
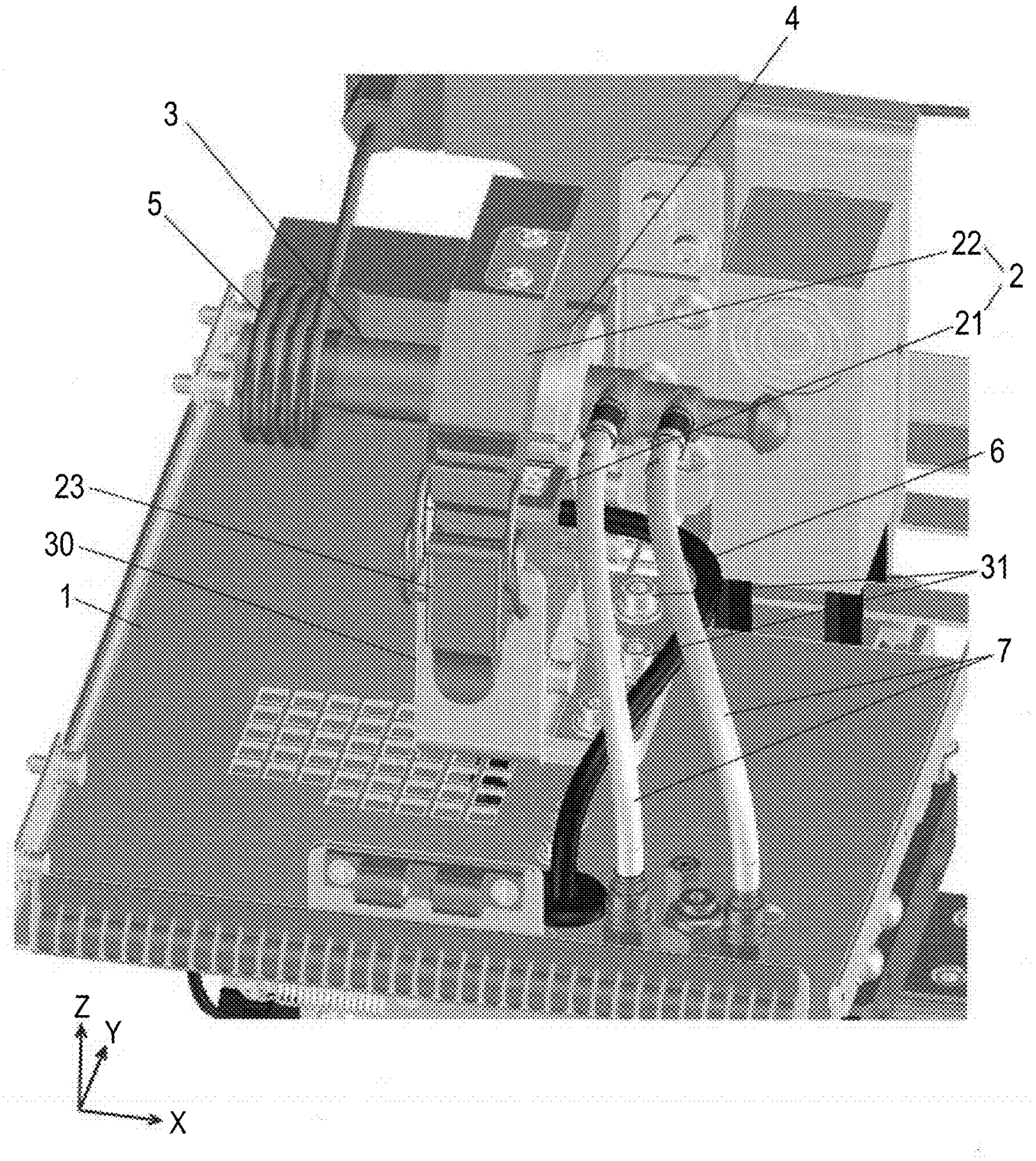
FIG. 1 is a perspective view of an inductively coupled plasma generator according to an embodiment of the invention.
Figure 2:
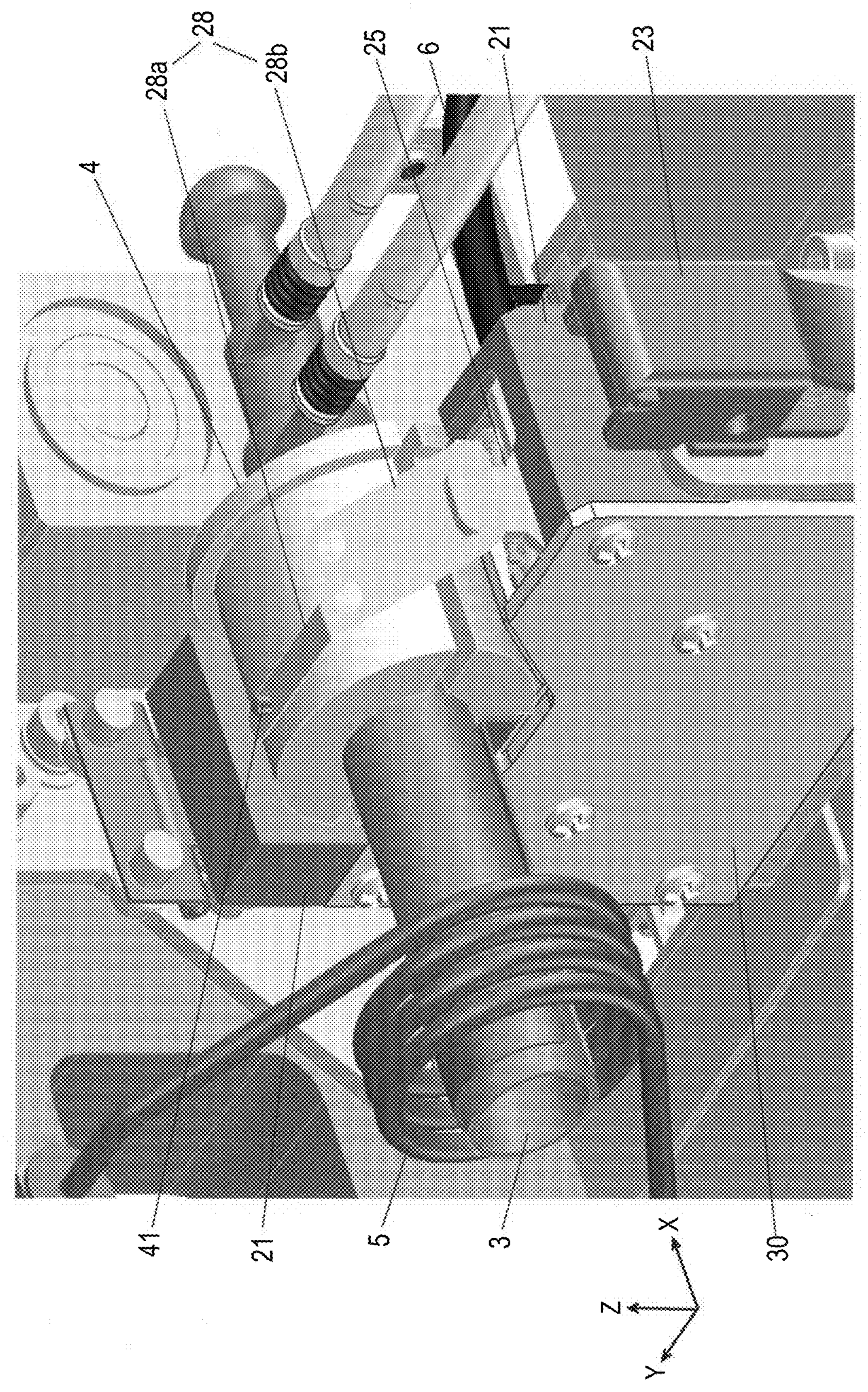
FIG. 2 is a perspective view of a state in which an upper holder is seen through in the inductively coupled plasma generator of the present embodiment.
Figure 3:
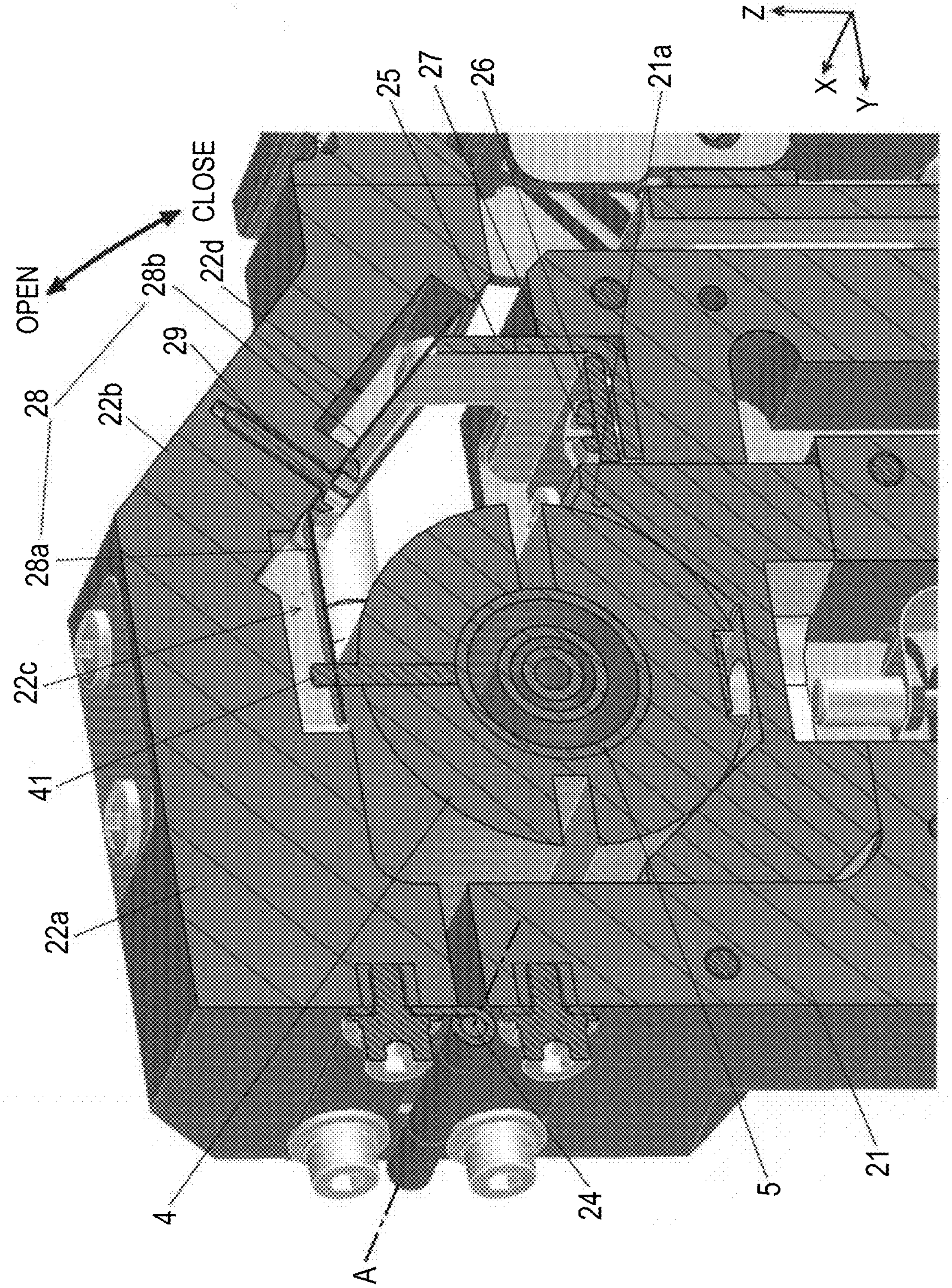
FIG. 3 is a cross-sectional view taken along a Y-Z plane of a torch holder portion in the inductively coupled plasma generator of the present embodiment.
Figure 4:
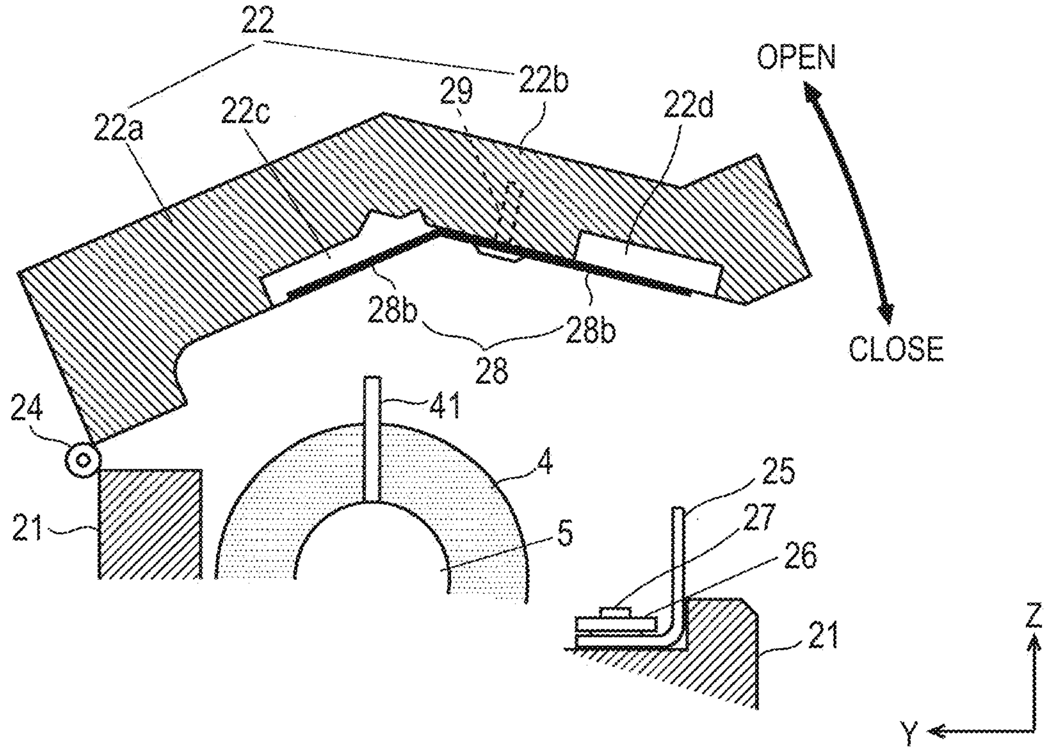
FIG. 4 is a schematic cross-sectional view illustrating a state of a conductive leaf spring at the time of opening and closing the upper holder in the inductively coupled plasma generator of the present embodiment.
Figure 4:
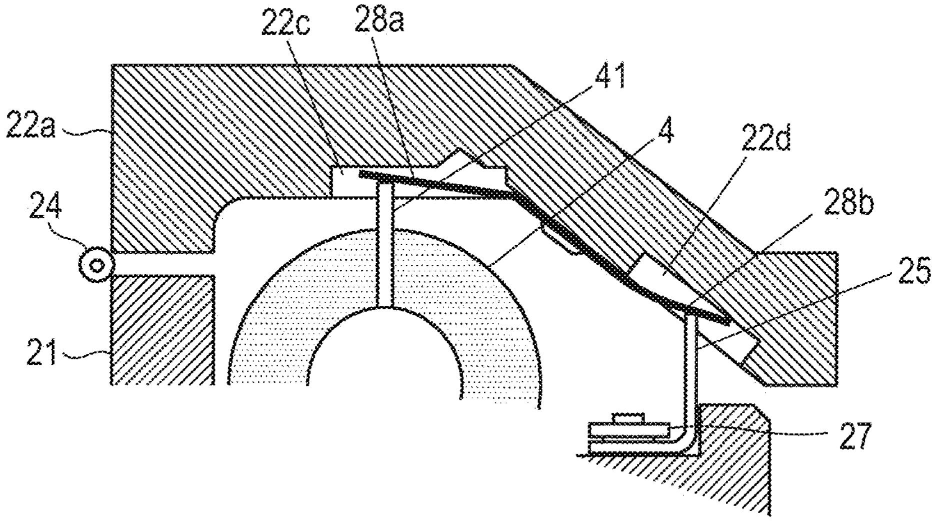
Figure 5:
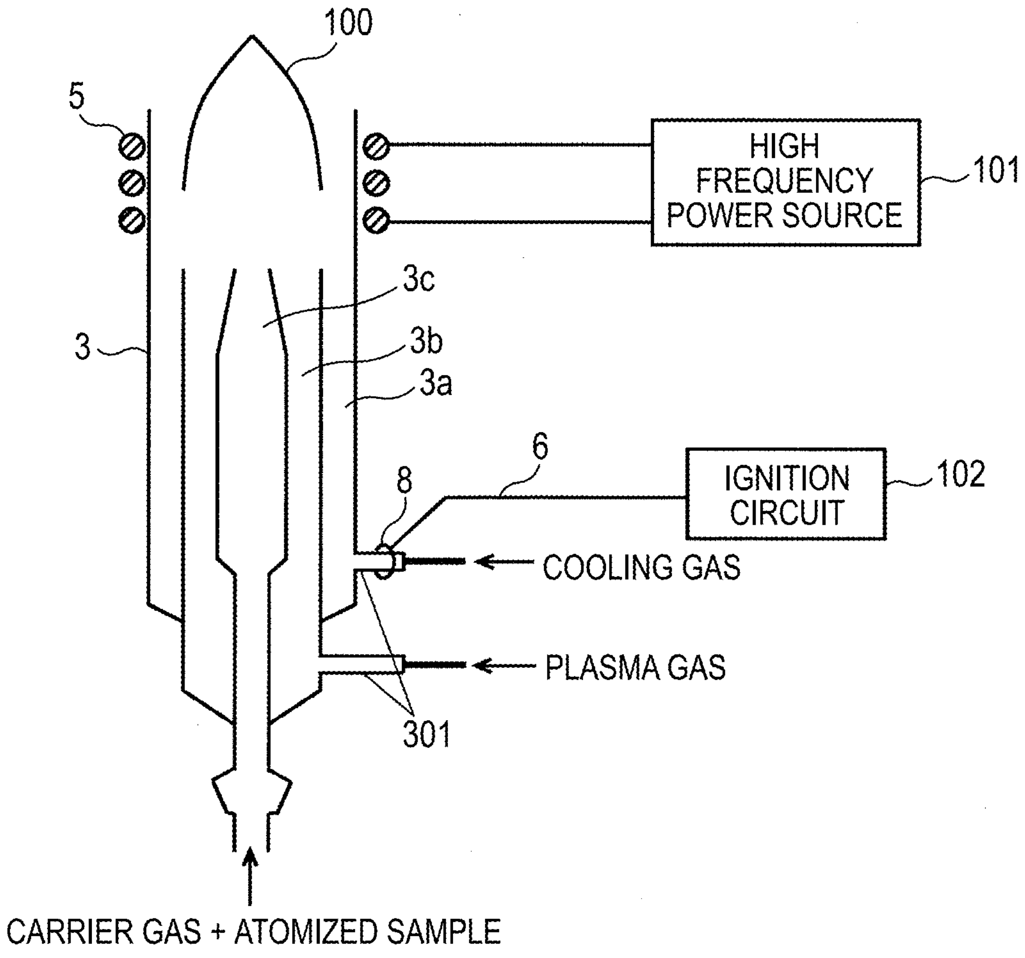
FIG. 5 is a schematic configuration diagram of a conventional inductively coupled plasma generator.
Figure 6:
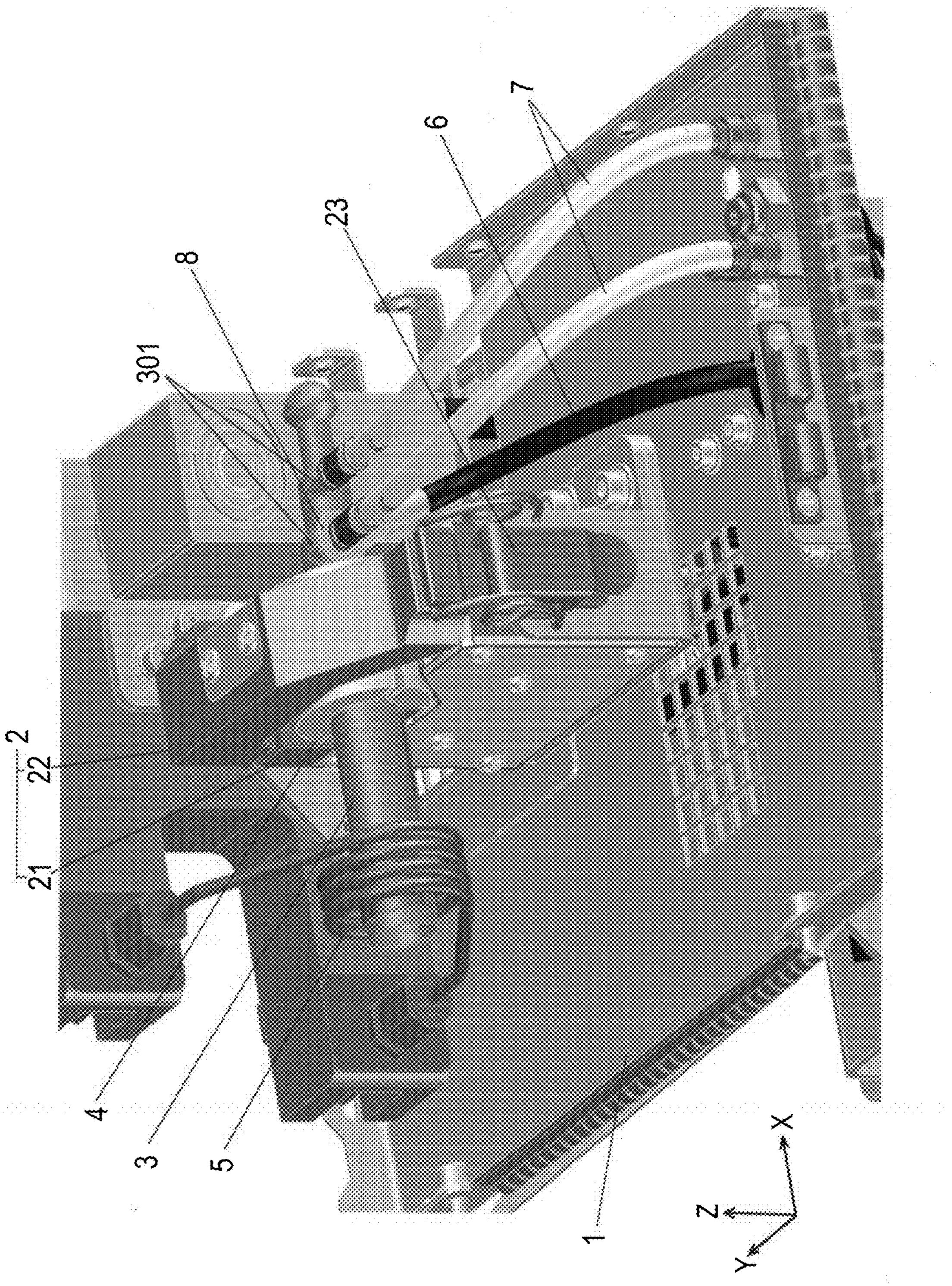
FIG. 6 is a perspective view of a conventional inductively coupled plasma generator.

Hereinafter, an inductively coupled plasma generator according to an embodiment of the invention will be described with reference to the accompanying drawings. FIG. 1 is a perspective view of the inductively coupled plasma generator of this embodiment, FIG. 2 is a perspective view in a state in which an upper holder is seen through, FIG. 3 is a cross sectional view of the torch holder part in the Y-Z plane, and FIG. 4 is a schematic cross-sectional view illustrating a state of a conductive leaf spring at the time of opening and closing of the upper holder. For the sake of convenience, in FIGS. 1 to 4, an X-axis, a Y-axis and a Z-axis orthogonal to each other are set as illustrated. The same or corresponding constituent elements as those already described with reference to FIGS. 5 and 6 are denoted by the same reference numerals.

A plasma torch 3 made of quartz glass, which is a coaxial triple cylindrical pipe structure similar to the conventional example, is fitted through a torch adapter 4 having a substantially flat annular outer shape. The torch adapter 4 is made of an insulator such as polytetrafluoroethylene (PTFE) resin, and as illustrated in FIGS. 3 and 4, a conductive rod body 41, which has one end exposed to an inner circumferential surface of a central opening portion and the other end extending outward from an outer circumferential surface, is buried in the torch adapter 4 to extend in the radial direction. Since the plasma torch 3 is fitted in the central opening portion of the torch adapter 4, the leading end of the rod body 41 on the inner circumferential side is in contact with the outer circumferential surface of the plasma torch 3. There is a plurality of types of plasma torch 3 having different outer diameters, but a plurality of torch adapters 4 having a central opening portion of an inner diameter corresponding to each outer diameter and having the same (common) outer diameter are prepared, and a torch adapter matching the outer diameter of the plasma torch is used. Therefore, even when any type of plasma torch is used, the outer diameter of the torch adapter 4 or a protruding length of the rod body 41 from the outer circumferential surface of the adapter 4 is the same.

A torch holder 2 has a lower holder 21 fixed to a base 1 with a metal fitting fixing screw 31 via a metal fitting 30, and an upper holder 22 fixed to the lower holder 21 by a hinge 24 so as to be freely pivotable. The lower holder 21 and the upper holder 22 are made of an insulator such as polyethylene terephthalate (PET) resin. As can be seen from FIG. 3, although the lower holder 21 is not a single member but combinations of a plurality of members, it is obvious that the lower holder 21 may be made up of a single member. The upper holder 22 is free to pivot with respect to the lower holder 21 about an axis A (parallel to the X-axis in this example) of the hinge 24, and a draw latch (corresponding to the engaging part in the present invention) 23 is provided to fix the upper holder 22 to the lower holder 21 in a state in which the upper holder 22 is closed so as to sandwich the torch adapter 4 between the upper holder 22 and the lower holder 21. This is the same as the conventional configuration illustrated in FIG. 6.

A metal plate member (corresponding to the conductive second member in the invention) 25 having a substantially L-shaped cross section is attached to the upper surface of the lower holder 21 so as to be accommodated in a gap formed between the lower holder 21 and the upper holder 22 when the upper holder 22 is closed. The distal end of a cable line 6, one end of which is connected to the ignition circuit, is fixed to the lower holder 21 by a wiring fixing plate fixing screw 27, in a state of being sandwiched between the metal plate member 25 and a wiring fixing plate 26 placed to overlap the top thereof. Thus, the electrical connection between the ignition circuit and the metal plate member 25 is secured through the cable line 6.

The upper holder 22 integrally has a horizontal part **22*a* which is substantially horizontal in the state in which the upper holder 22 is closed, and an inclined part 22*b* which is inclined. Recessed parts 22*c* and 22*d* are formed on lower surfaces (surfaces on an inner side in a state in which the upper holder 22 is closed) of the horizontal part 22*a* and the inclined part 22*b*, respectively. The recessed part 22*c* on the side of the horizontal part 22*a* is formed at a position where the protruding part of the rod body 41 protruding just above the torch adapter 4 held by the lower holder 21 is received, when the upper holder 22 is closed. On the other hand, the recessed part 22*d* of the inclined part 22*b* side is formed at a position where the leading end of the vertically rising upright piece part of the metal plate member 25 fixed to the lower holder 21 is received, when the upper holder 22** is closed.

A conductive leaf spring member (electrically conductive first member in the invention) 28 bent in a V-shaped cross section is fixed on the lower surface of the inclined part **22*b* of the upper holder 22, by a leaf spring fixing screw 29. One flexible piece 28*a* of the leaf spring member 28 extends to a position which substantially covers the recessed part 22*c* on the horizontal part 22*a*** side, and the other flexible piece

28*b* of the leaf spring member 28 extends to a position which substantially covers the recessed part 22*d* on the inclined part 22*b* side.

When the plasma torch 3 is mounted on the torch holder 2, the operator places the torch adapter 4 with the plasma torch 3 fitted in the central opening portion on a support receiving part 21*a* of the lower holder 21 so that the protruding part of the rod body 41 faces approximately directly above, in a state in which the draw latch 23 is unlocked and the upper holder 22 is opened so as not to cover the upper side of the lower holder 21. Further, as illustrated in FIG. 4*b*, when closing the upper holder 22 and tightening the draw latch 23, the plasma torch 3 is held by the torch holder 2 via the torch adapter 4. At this time, the leading end of the protruding part of the rod body 41 pushes one flexible piece 28*a* of the leaf spring member 28 upward (Z-axis direction), and the flexible piece 28*a* is deflected and enters the recessed part 22*c*. Since the rod body 41 is pushed downward by the elastic force of the deflected flexible piece 28*a*, electrical conduction through the contact part in which the leaf spring member 28 and the rod body 41 abut against each other is securely ensured. Further, since the torch adapter 4 is pressed against the support receiving part 21*a* of the lower holder 21 from above, positional deviation or the like is hard to occur and the torch adapter 4 is stably held.

On the other hand, the upper end of the rising piece part of the metal plate member 25 pushes the flexible piece 28*b* of the leaf spring member 28 upward, and the flexible piece 28*b* is deflected to enter the recessed part 22*d*. That is, each of the recessed parts 22*c* and 22*d* is a space for escaping when the flexible pieces 28*a* and 28*b* of the leaf spring member 28 are deflected. Since the rising piece part of the metal plate member 25 is pushed downward by the elastic force of the deflected flexible piece 28*b*, the electrical conduction via the contact part in which the leaf spring member 28 and the metal plate member 25 abut against each other is surely ensured. Thus, in a state in which the plasma torch 3 is appropriately loaded and the draw latch 23 is tightened, electrical conduction between the metal plate member 25 and the rod body 41 via the leaf spring member 28 is ensured, and an electrical conduction path from the ignition circuit to the outer circumferential surface of the plasma torch 3 is secured. As a result, when a high-voltage pulse is generated in the ignition circuit, the high-voltage pulse can be reliably applied to the plasma torch 3 to ignite the plasma.

Unlike the conventional device, in the inductively coupled plasma generator of this embodiment, since the operation of replacing the cable line 6 for plasma ignition at the time of replacing the plasma torch 3 is not necessary at all, replacement operation can be efficiently performed. This also applies to the case where the plasma torch is replaced for one having a different outer diameter.

The above-mentioned embodiment is an example of the invention, and even when a change, a correction or an addition is appropriately made within the scope of the spirit of the invention, it is natural that they are included within the scope of the claims of the invention.

For example, in the above embodiment, the distal end of the cable line 6 is fixed to the lower holder 21, and the electrical conduction between the cable line 6 and the plasma torch 3 is secured via the metal plate member 25 attached to the lower holder 21, the leaf spring member 28 attached to the upper holder 22, and the rod body 41 buried in the torch adapter 4. However, the distal end of the cable line 6 may be fixed to the upper holder 22 so that the cable line 6 is electrically connected to the leaf spring member 28 without passing through the metal plate member 25. However, in that case, as the upper holder 22 is opened and closed, an unnecessary load is applied to the cable line 6. Therefore, it is preferable that the distal end of the cable line 6 be fixed to the lower holder 21 instead of the upper holder 22.

The means for fixing the upper holder 22 to the lower holder 21 when closing the upper holder 22 is not limited to the draw latch 23, another engaging means capable of performing a reliable engagement by a predetermined manipulation and operation of the operator may be used.

The invention claimed is:

1. An inductively coupled plasma generator which supplies high-frequency power to an inductive coil disposed outside a leading end portion of a plasma torch having a substantially cylindrical outer shape to form an inductively coupled plasma flame at a leading end of the torch, the inductively coupled plasma generator comprising:

a) a torch adapter which is a substantially flat annular insulative body having an opening portion into which the plasma torch is inserted, and within which a conductive rod body is disposed, the conductive rod body extending in a radial direction relative to the torch, one end of the conductive rod body being exposed to face the opening portion, and the other end of the conductive rod body protruding by a predetermined length toward an outer circumferential side;

b) a torch holder which holds the plasma torch substantially horizontally by grasping the torch adapter into which the plasma torch is inserted, and has a lower holder which supports a lower side of the torch adapter, an upper holder which suppresses an upper side of the torch adapter, and an engaging part which fixes the upper holder to the lower holder in a state in which the torch adapter is interposed; and c) a conductive first member which is electrically connected to a cable line for applying a voltage for plasma ignition and provided in the upper holder, and has a first contact part which abuts on the rod body to press the rod body downward by an elastic force, when the upper holder is closed and engaged by the engaging part in a state in which the torch adapter is placed on the lower holder so that the protruding part of the rod body of the torch adapter faces upward.

2. The inductively coupled plasma generator according to claim 1, wherein the conductive first member is a conductive leaf spring member.

3. The inductively coupled plasma generator according to claim 1, wherein the torch adapter has an inner diameter of an opening portion corresponding to an outer diameter of a plasma torch to be used, and an outer diameter, which is a substantially flat annular body, is common regardless of the outer diameter of the plasma torch.

4. The inductively coupled plasma generator according to claim 1, wherein the upper holder is pivotally mounted about an axis substantially horizontal to the lower holder, and the engaging part is a draw latch which engages the upper holder and the lower holder in a state in which the upper holder is closed with respect to the lower holder.

5. The inductively coupled plasma generator according to claim 1, wherein a conductive second member extending vertically and electrically connected to a cable line for applying a voltage for plasma ignition is provided in the lower holder, and the conductive first member has a second contact part which abuts on the upper end of the conductive second member to press the second member downward by elastic force, when the upper holder is closed and engaged by the engaging part.

6. The inductively coupled plasma generator according to claim 2, wherein a conductive second member extending vertically and electrically connected to a cable line for applying a voltage for plasma ignition is provided in the lower holder, and the conductive first member has a second contact part which abuts on the upper end of the conductive second member to press the second member downward by the elastic force, when the upper holder is closed and engaged by the engaging part.

7. The inductively coupled plasma generator according to claim 3, wherein a conductive second member extending vertically and electrically connected to a cable line for applying a voltage for plasma ignition is provided in the lower holder, and the conductive first member has a second contact part which abuts on the upper end of the conductive second member to press the second member downward by the elastic force, when the upper holder is closed and engaged by the engaging part.

8. The inductively coupled plasma generator according to claim 4, wherein a conductive second member extending vertically and electrically connected to a cable line for applying a voltage for plasma ignition is provided in the lower holder, and the conductive first member has a second contact part which abuts on the upper end of the conductive second member to press the second member downward by the elastic force, when the upper holder is closed and engaged by the engaging part.

* * * * *